Figure 3:
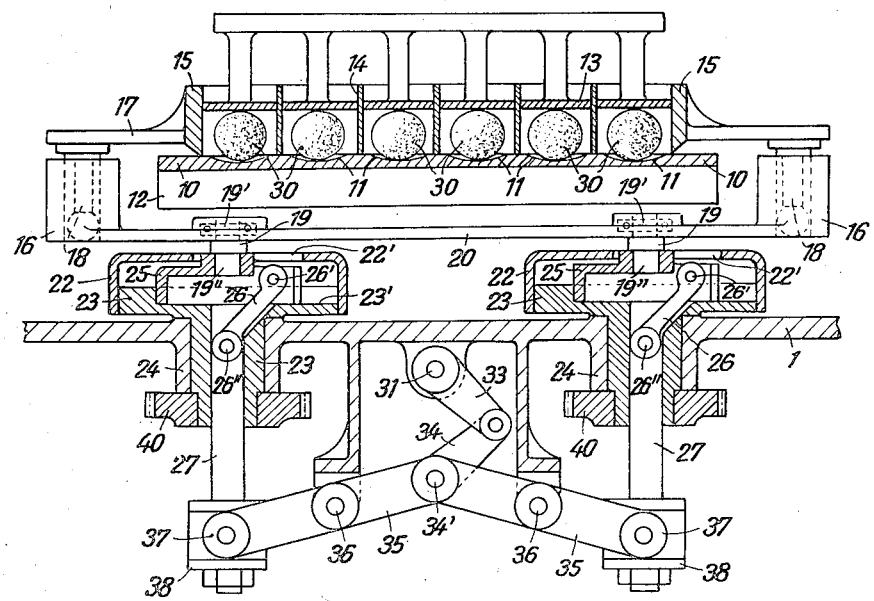

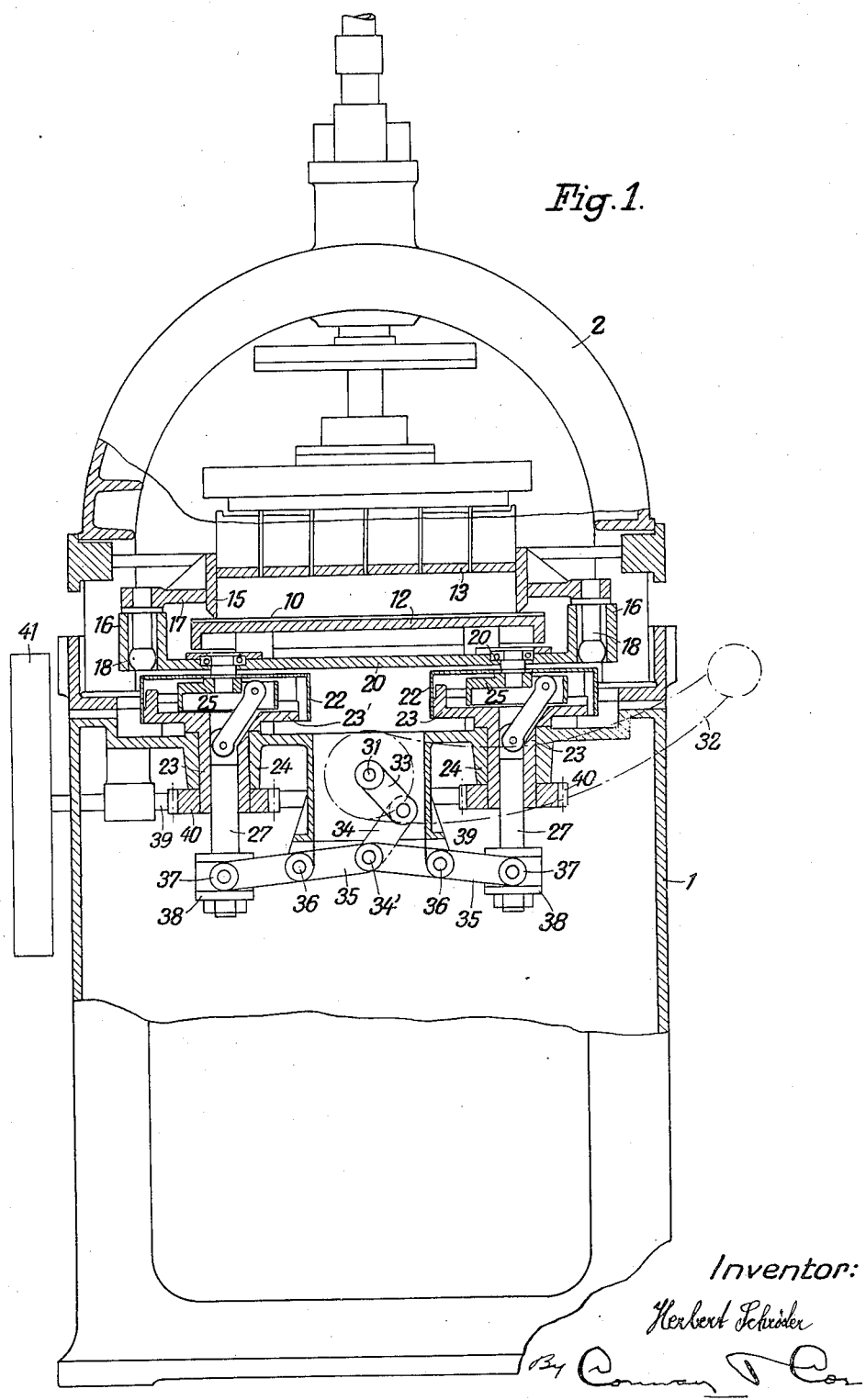

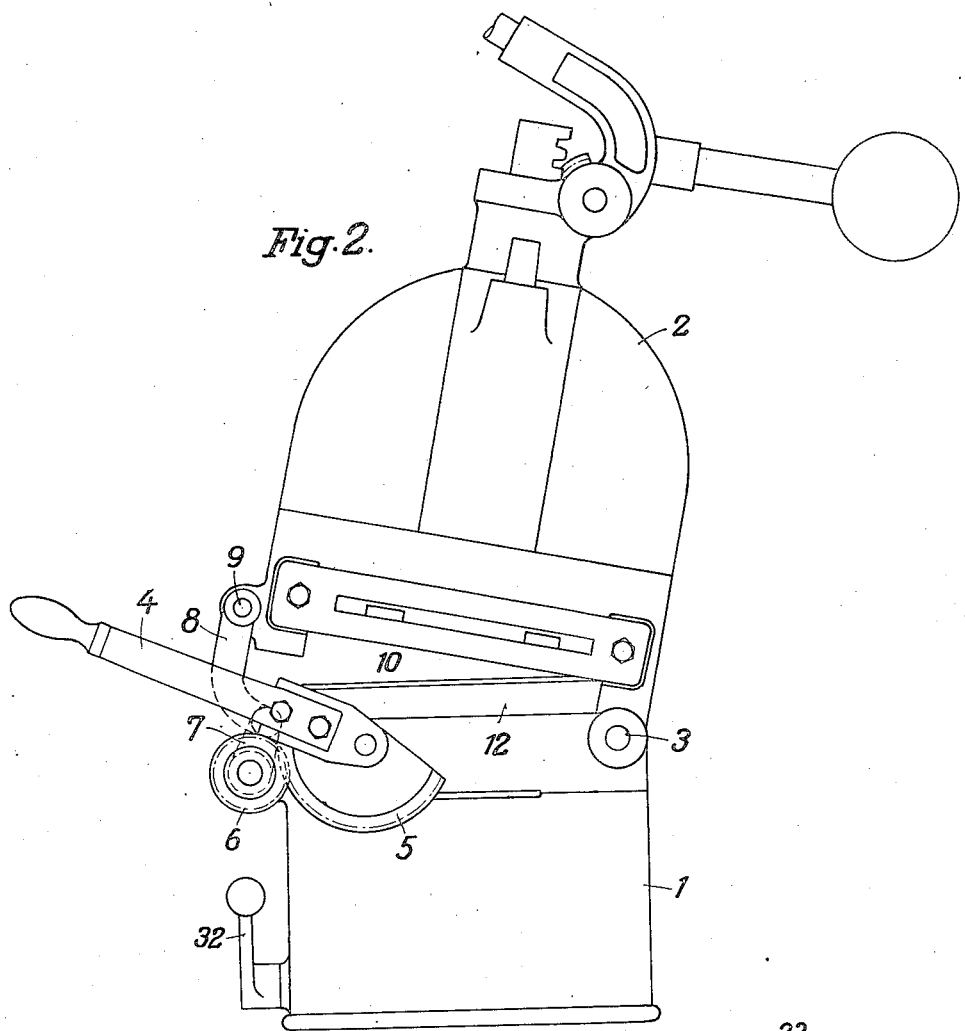
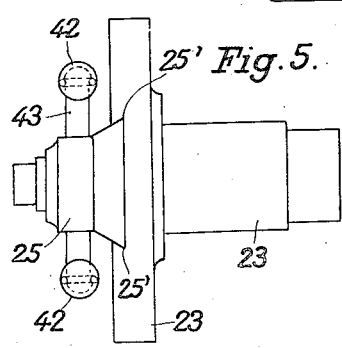
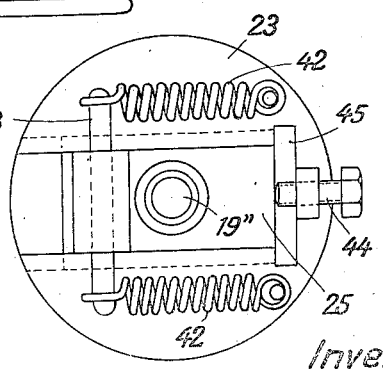

Jan. 16, 1934.  H. SCHRÖDER  1,944,112
DOUGH DIVIDING AND WORKING MACHINE
Filed May 3, 1929  6 Sheets-Sheet 3

Inventor:
Herbert Schröder

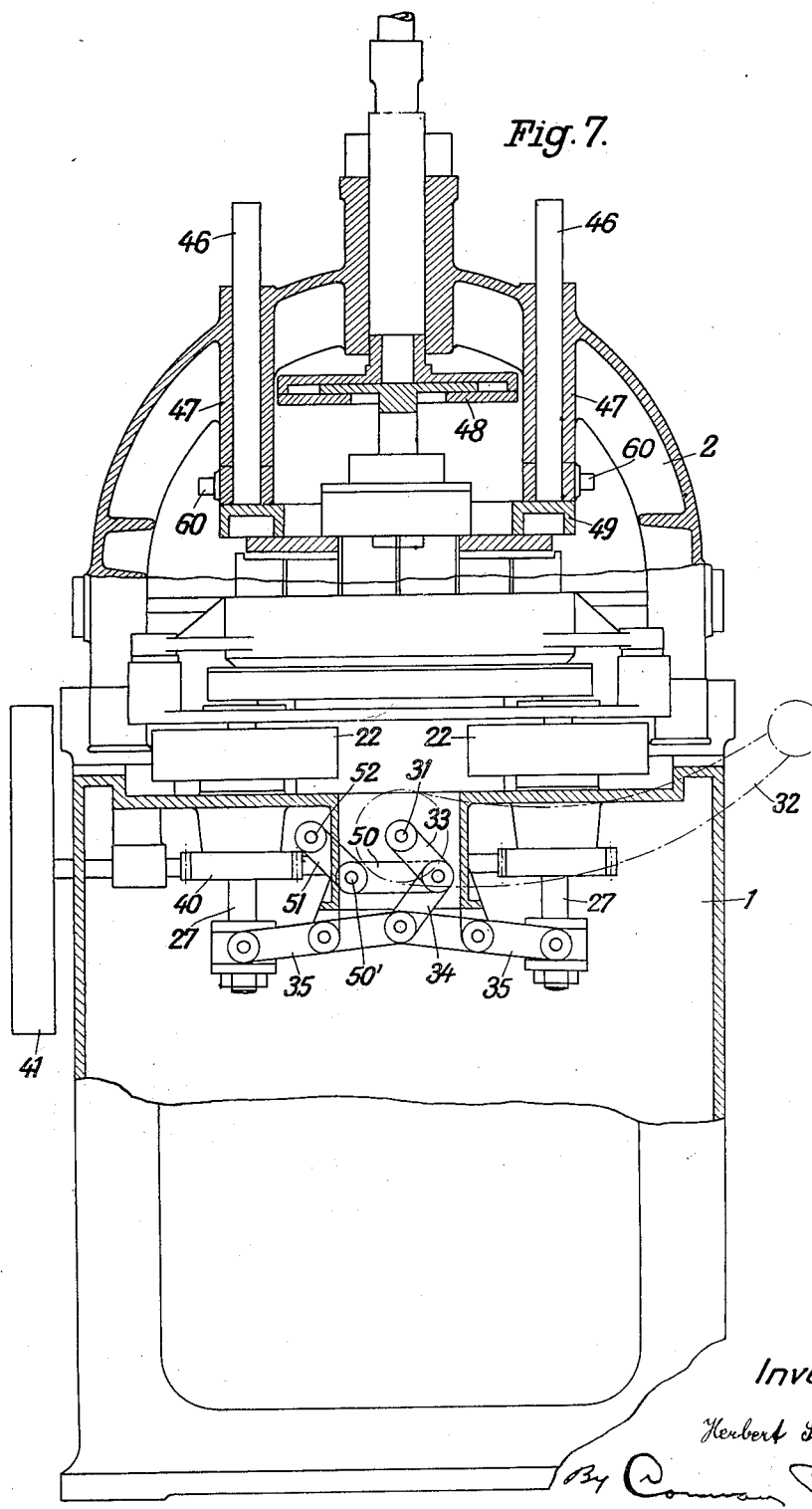

Jan. 16, 1934.   H. SCHRÖDER   1,944,112
DOUGH DIVIDING AND WORKING MACHINE
Filed May 3, 1929   6 Sheets-Sheet 5
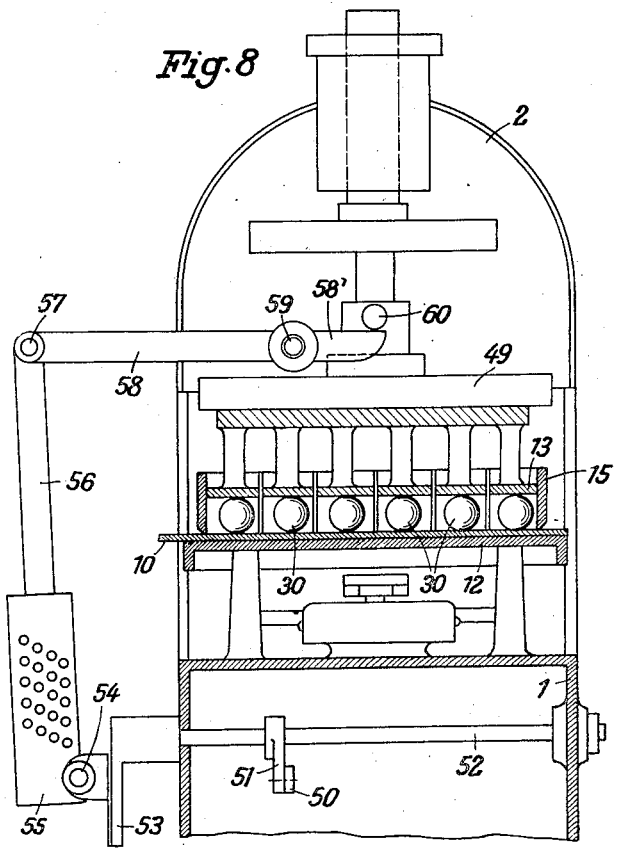
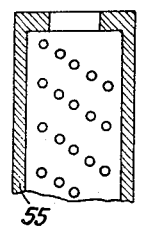
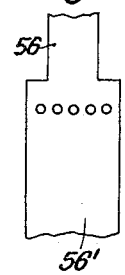
Inventor:
Herbert Schröder
By Conway Cox
attorney Jan. 16, 1934.   H. SCHRÖDER   1,944,112
DOUGH DIVIDING AND WORKING MACHINE
Filed May 3, 1929   6 Sheets-Sheet 6

Inventor:
Herbert Schröder

Patented Jan. 16, 1934

1,944,112

UNITED STATES PATENT OFFICE 1,944,112

DOUGH DIVIDING AND WORKING MACHINE

Herbert Schröder, Triebes, Germany

Application May 3, 1929, Serial No. 360,207, and in Germany June 28, 1927

6 Claims. (Cl. 107—20)

The subject matter of this application is disclosed in my foreign applications filed in Germany on June 28, 1927 and April 16, 1928.

My invention relates to dough-dividing and working machines, more particularly to the class of machines in which a carrier plate is combined with a dividing and working head adapted to move in parallel to the plate and to perform a gyratory movement across the plate.

It is an object of my invention to improve a machine of this type with a view to increasing its adaptability, so that pieces of various sizes may be worked in a single machine.

To this end I equip the rotary member or members for imparting gyratory movement to the head, which will be referred to as "the eccentrics", with means for varying their effective radius which determines the extent of the gyratory movement of the head, which radius will be referred to as the "eccentricity". Preferably the radius varying means are adapted to be actuated while the machine is in operation.

By varying the effective radius the scope of application of the machine may be essentially enlarged and the capacity of said machines will no longer depend to such a degree as had heretofore been the case upon the size or weight of the pieces of dough to be worked by the machine. By properly varying the eccentricity of said eccentrics and therewith of the working stroke it will be possible to work in a single machine pieces of dough which are about three times as large as the pieces which may be worked in a machine of ordinary construction.

A further essential feature of my invention consists in the fact that the eccentricity of the eccentrics which serve for actuating the members for working the dough may be varied from zero to a maximum value.

Adjustment of the eccentrics may be accomplished in a variety of ways. Thus, for instance, it is possible to adjust the stroke of the eccentrics in accordance with the size of the piece of dough to be worked by the machine at any time and thereupon adjust the movement of the members which serve for the operation of working the dough. After completion of the operation of working the dough the members which serve for the operation of working the dough are thrown out of operation and the eccentrics adjusted to zero eccentricity in order to take the finished pieces of dough out of the machine.

According to this invention the eccentricity of the eccentrics is adjusted, during operation of the machine, from zero to a maximum value. By virtue of this fact first, the driving motor may continue to rotate during the entire performance of the machine, and especially during the operation of dividing and pressing the pieces of dough, these operations requiring only a few seconds, without providing any kind of clutches or the like which are likely to get out of order and in addition are rather expensive. According to my invention the motions for working the dough are brought about by moving the eccentrics out of their position of zero eccentricity and progressively to their full working stroke during operation of the driving motor. Only the dividing and working head or the table of the machine must be accelerated, and these members of the machine may easily be brought from condition of rest to their full working motion, because it will be possible to commence with a very small working stroke and increase the gyratory motion, that is to cause the machine to operate at full working stroke, after maximum speed has been attained.

In order to bring about variation of the eccentricity of the driving eccentrics and to accomplish variation of the position of said slides, a variety of constructions may be used. This invention, therefore, is not confined to the specific constructions described herein and shown in the drawings.

My invention further comprises a special mode of cooperation of the driving mechanism with the pressure-plate.

In known machines of the kind to which my invention relates, either the weight of the pressure-plate had been counter-acted by a counter-weight during the entire operation of working the dough, and only a slight pressure had thus permanently been exerted upon the dough permitting upward motion of the pressure-plate during expansion of the dough, or said pressure-plate had been moved by means of a special mechanism into its upper position. In the first-mentioned case the counter-weight must be adjusted, if necessary even during the operation of working the dough, in accordance with the friction between the dividing knife and the pressure-plate. An adjustment of this kind, however, is not a simple matter, because frequently particles of dough will adhere to the knives, said particles of dough becoming more or less hard, so that the pieces of dough will not be able to move the pressure-plate upward through the system of knives, which power had been sufficient during the preceding operation with a definite adjustment of the counter-weight.

In the second-mentioned case there had been the disadvantage that the attendance of the machine is connected with difficulties.

According to the invention, positive means are provided for raising the pressure plate during the initial stages of the working. This is effected by means of a system of levers connected to a crank carried by the shaft of an actuating lever which serves for varying the effective radius or eccentricity, said system of levers being further fulcrumed to a forked lever or the like acting upon the pressure-plate by means of an intermediate mechanism such as tension rods and the like.

In order to properly adjust the distance between the working table of the machine and the pressure-plate in accordance with the quantity of dough supplied to the machine at any time, that is, in accordance with the size of the pieces of dough to be worked in the machine, according to my invention there is further provided an adjusting sleeve interposed between the pressure plate and the system of levers, said sleeve having a central bore permitting insertion of an adjusting member which may be fixed on said sleeve by means of a plug in different positions thereon.

In the accompanying drawings, machines embodying my invention are illustrated by way of example.

Figure 4:
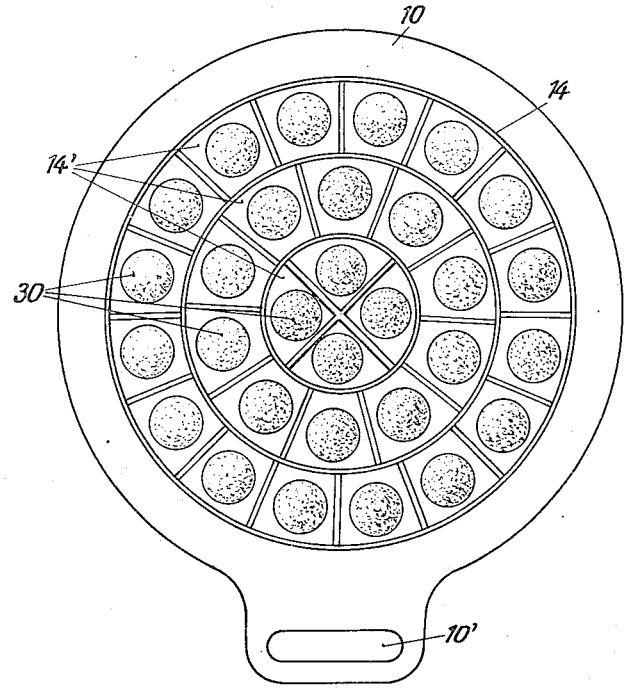
Figure 9:
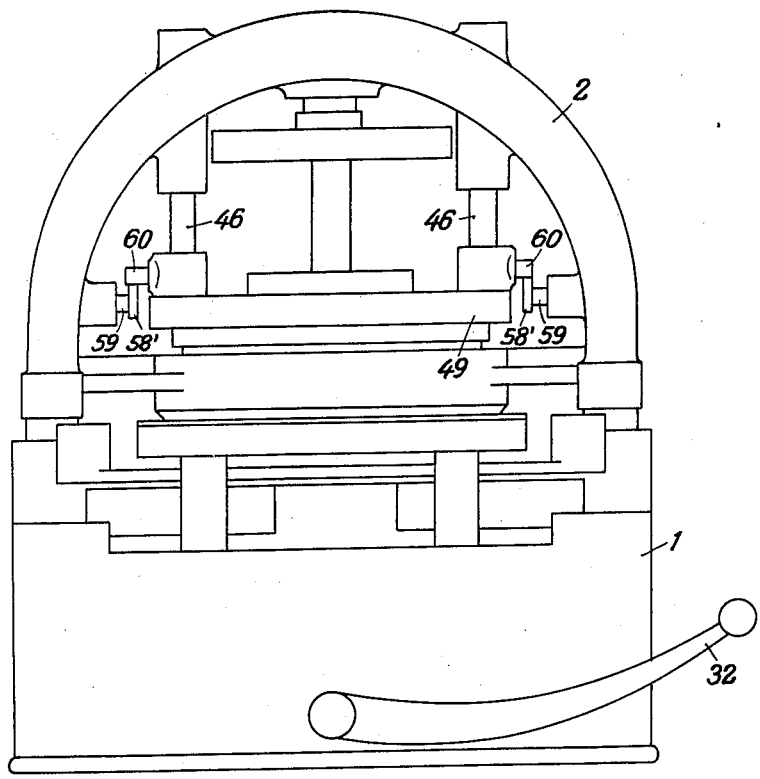

In the drawings,

Fig. 1 is a partial vertical section through the center of a machine constructed according to my invention, the upper part being shown partly in elevation, Fig. 2 a side view of the machine shown in Fig. 1 with the head in lifted condition, Fig. 3 a section, drawn to a larger scale, through the drive for the dough working members of the machine, Fig. 4 a plan view of the knives in the working head, Figs. 5 and 6 detail views of means for varying the effective radius or eccentricity, Fig. 7 a partial cross-section through the above-mentioned second form of construction of the machine according to my invention, the actuating device for varying the eccentricity of the eccentrics serving simultaneously for actuating the pressure-plate, Fig. 8 a partial section at right angles to the section in Fig. 7, Fig. 9 another view of the machine, and Figs. 10 and 11 show details of the adjusting device for the pressure-plate.

In general the machine according to my invention comprises an under frame 1 which carries a working table 12 by means of pillars, columns or similar supporting members. The upper part 2 of the machine which part contains the parts for dividing, pressing and working the dough is hinged onto said under frame 1 at 3, Fig. 2, to permit lifting of said upper part at the front end thereof. Lifting of the upper part or head 2 is accomplished by means of a hand-lever 4 which is connected with a toothed segment 5 mounted to rotate in the under frame 1. The toothed segment 5 engages with a gear-wheel 6, a crank 7 being keyed to the shaft of said gear-wheel 6 and pivotally connected to a bent lever 8 which is fulcrumed at 9 to the upper part 2 of the machine. By actuating the hand-lever 4 the upper part 2 may be swung upward into the position shown in Fig. 2 or it may be lowered to close up the working table 12 of the machine.

When dough is supplied to the machine, the upper part or head 2 is lifted as shown in Fig. 2. A cake of dough is now placed upon the carrier plate 10 outside of the machine, said plate being provided with depressions 11, Fig. 3, for the reception of the finished pieces. The carrier plate 10 is placed on the working table 12 by means of a handle 10' and thereupon fixed on said working table by pins or the like. After closing the head 2, as shown in Fig. 1, and after the ring-shaped member 15 surrounds the batches of dough, first the pressure-plate 13 is moved downward, thus pressing flat the several batches of dough, whereupon said batches will be cut by the knives 14 passing through slots in the pressure-plate, the knives now contacting with the carrier plate 10. Constructional details of the devices which serve for pressing and dividing the dough are not given herein, since various forms of such devices are well known in practice.

After the operation of pressing and dividing the dough, the knives 14 must be given a gyratory motion in order to effect the operation of working the dough. This is done as follows: The parts which serve for effecting the working of the dough, that is the pressure-plate 13 together with the knives 14 and the ring 15 are mounted in sockets 16 provided on the ends of a rail 20 by means of lateral extensions 17 on said ring and a pair of bolts 18 having ball-shaped ends. The rail 20 serves for imparting gyratory motion to the aforementioned parts, said motion being effected as follows: The shaft 39 (Fig. 1) which is mounted in the machine frame may be driven by means of a pulley 41 or an electric motor (not shown) may be directly coupled with said shaft 39. Worm-gears 40 are in mesh with worms (not shown) mounted on said shaft, said worm-gears being secured in driving members or hollow shafts 23 fixedly mounted at 24 in the machine frame. The driving members 23 are of disk-shaped conformation at their upper part and serve for the reception of special slides 25 guided by means of dove-tail extensions 25' (Fig. 5) in the upper part of said driving members 23, so that the slides may be displaced along a horizontal track surface 23'. The slides 25 are connected with the rail 20 by special driving bolts 19 which engage at their under part 19'' with said slides 25, while the upper parts 19' of said bolts are mounted to rotate freely in the rail 20 by means of ball-bearings.

In position of rest, as shown for instance in Fig. 3, the central axes of the driving bolts 19 will coincide with the central axes of the driving members 23. Besides, the depressions 11 provided in the carrier plate 10 are so arranged that in this position of the slides every depression 11 will be placed exactly in the center of the respective chamber 14' formed by the knives 14.

During operation of the driving motor the driving members 23 together with the slides 25 will rotate around the driving bolts 19. To initiate the operation of working the dough, the slides 25 must be moved into operative position, which is accomplished by the aid of levers 26 which at their upper ends are fulcrumed at 26' to said slides 25, while the lower ends of said levers 26 are fulcrumed at 26'' to a rod 27 passing through the hollow driving members 23. The rods 27 likewise participate in the rotation and carry at their under ends special slide bearings 38 for the ends 37 of two double-armed levers 35. The levers 35 are each mounted rotatably around a pivot 36 fixed on the machine frame and are connected with each other by a pivot 34'. This pivot 34' engages with a lever 34 which is fulcrumed to a crank 33 fast on a shaft 31. The shaft 31 extends through the machine and carries a curved hand-lever 32 at its outer end.

The mode of operation of the aforedescribed machine now will be as follows: The driving motor operates continuously and accordingly the driving members 23 together with the slides 25, the levers 26 and the rods 27 will be rotated. The rail 20, however, as well as the other parts which serve for working the dough are at first in position of rest, the central axes of the driving bolts 19 co-inciding with the central axes of the slides 25. In order to subject the divided dough to the operation of working, the lever 32 is depressed, thus causing the ends 37 of the levers 35 as well as the two rods 27 to move upward, thus effecting motion of the slides 25 out of their inoperative position shown in Fig. 3 towards the right by action of the levers 26. The rail 20 will thus be given a gyratory motion which is transmitted to all other parts which serve for the working of the dough so that the knife chambers 14' will rotate around the divided batches of dough and work the latter into the form of round balls 30 (Figs. 3 and 4). Obviously the amount of downward swinging of the hand-lever 32 will determine the length of the stroke of the parts which serve to perform the working of the dough.

After completion of the operation of working the dough the hand-lever 32 is released to return into its initial position. The slides 26 will then again come into inoperative position and finally the several batches of dough will be positioned within the several knife chambers as shown in Fig. 4, that is every batch of dough will be exactly in the center of the respective knife chamber 14' and in addition, there will be a certain distance between the knives and the entire periphery of the batch of dough positioned therebetween, so that any rubbing of the dough at the wall of the knife chamber which could injure the cuticle of the dough will be absolutely prevented. The upper part 2 of the machine may now be lifted and the carrier plate 10 with the completed batches of dough taken off the table 12 of the machine.

In order to facilitate return motion of the slides 25 into inactive position, further provisions are made according to my invention. As above mentioned, the slides 25 are guided in the driving members 23 by means of dove-tail shaped extensions 25'. A pin 43 (Figs. 5 and 6) passes through each of the slides 25 and springs 42 are provided intermediate either end of said pins, the other end of said springs 42 being fixed to the driving members. If the slides 25 upon depression of the hand-lever 32 are moved out of their inactive position, said springs 42 will be tensioned and as soon as the hand-lever is released, said springs 42 will again retract each slide into inactive position. For purposes of adjustment provision is made of a transverse plate 45 with screw bolts 44 and counter-nuts thereon.

In order to afford protection against intrusion of residues of dough, flour-dust and the like into the operating members of the machine, the driving members 23 as well as the slides 25 are covered up by protective caps 22 provided with slots 22' in which the upper part of the slides 25 may move.

The construction of the machine as shown in Figs. 7 to 11 comprises further mechanism for varying the eccentricity of the eccentrics 23 and for actuating the presser plate 13 at the same time.

After the dough has been pressed and divided, a proper space must be left above the several batches of dough to permit expansion thereof during the operation of working. Subsequent to the operation of pressing and dividing, however, the pressure-plate at first will still rest with some pressure upon the batches of dough. According to my invention the pressure plate 13 is now positively moved upward a certain adjustable distance, when initiating the operation of working the dough.

The pressure-plate may be freely moved upward through the knives after completing the operation of pressing and dividing. For this purpose the ring 49 on which the pressure-plate 13 is mounted displaceably in horizontal direction may be actuated by guide-rods 46 which are slidably mounted in guides 47 provided on the upper part 2 of the machine as shown in Fig. 7. In addition to this, said ring 49 is provided with special lugs 60.

A connecting member 50 engages with the pivot connecting the levers 33 and 34 (Figs. 7 and 8), said connecting member being further fulcrumed to the crank 51 fast on the shaft 52. The shaft 52 is mounted in the machine frame and carries a further crank 53 (Fig. 8).

The shaft 52 is mounted in the machine frame and a further crank 53, as shown in Fig. 8, is mounted on the outer end of said shaft 52. An adjusting sleeve 55 is pivotally connected at 54 to said crank 53, said adjusting sleeve 55 being associated with a tension rod 56 which is slidable in said sleeve. A forked lever 58 is pivoted at 57 to said tension rod, said forked lever being mounted to rock around the pivot 59 fixed to the upper part 2 of the machine. The free ends 58' of the fork of the lever 58 engage from below with the above-mentioned lugs 60 on the ring 49 which is connected with the pressure-plate 13.

Upon depression of the hand-lever 32 the pivot 57 of the forked lever 58 will be moved downward by the intermediary of the connecting members 50, the crank 51, the shaft 52, the crank 53 and the rod 56, while the forked end 58' of said lever 58 engages from below with the lugs 65, thus moving the latter in upward direction and raising the guide-rods 46 together with the ring 49 and the pressure-plate 13.

The pressure-plate will be positively raised a proper amount in accordance with the free expansion of the batches of dough exposed to the operation of working in the several knife chambers.

As pieces of dough of different sizes have to be worked in my present machines, the distance between the carrier plate for the dough and the pressure-plate must be further adjusted in accordance with the quantity of dough which is to be worked by the machine. This may be done by means of the tension rod 56 which is equipped with an under part 56' of greater width provided with bores (Figs. 10 and 11), so that the sleeve 55 may be fixed to said part 56' in different positions by means of a plug inserted through one of the bores in the sleeve 55 into one of the bores on the under part 56' of the rod 56, thus causing the pressure-plate to be raised to a greater or smaller degree.

The bores in the tension rod 56 and in the sleeve 55 are arranged and distributed as shown in Figs. 10 and 11 so that the adjustment may be accomplished with any desired degree of fineness. Preferably also the quantity of dough may be indicated adjacent the bores which serve for adjustment, when the plug is inserted into any particular bore.

I claim:

1. In a dough dividing and working machine, in combination, a carrier plate, a dividing and working head moveable with respect to the carrier plate, means for imparting a gyratory movement to said head, comprising a rotatable shaft and a connection between said shaft and the moveable head, means for varying the position of said connection with respect to the center of rotation of said shaft during the operation of the device, whereby the radius of gyration of said head may be varied from zero to a maximum value.

2. A device as in claim 1, including resilient means for returning the connection between the rotatable shaft and the dividing and cutting head to center of rotation of said shaft upon cessation of operation of the device.

3. In a dough dividing and working machine, two members mounted for relative parallel movement therebetween, said members comprising a carrier plate and a working head, means for imparting a gyratory motion to one of said members, said means including a pivotally mounted element and a connection between said element and said moving member, and means for selectively varying the distance of said connection from the pivot of said element to a plurality of values between the maximum and minimum during the operation of the machine, whereby to regulate the radius of gyration of said moving member.

4. In a dough dividing and working machine, two members mounted for relative parallel movement therebetween, said members comprising a carrier plate and a working head, a pressure plate in said working head, means for imparting gyratory motion to one of said members, means for varying the radius of said gyratory motion, and means operatively connecting said pressure plate and said radius-varying means for raising said plate upon increase of the radius of gyration.

5. In a dough divider and rounder, the combination of a base, a plurality of knives and plungers, means for moving said knives and plungers towards and from said base, means for causing relative gyratory motion between said base and said knives and plungers, control devices for said last mentioned means and means operable by said control devices for moving said plungers away from said base.

6. In a dough divider and rounder, the combination of a dough supporting surface, a plurality of knives and plungers movable with respect to said surface, means for causing relative movement between said surface and said knives and plungers, control devices for said last mentioned means, and mechanism operable by said control devices for moving said plungers relatively to said knives and dough supporting surface.

HERBERT SCHRÖDER.